US007440492B2

(12) United States Patent
Maruyama

(10) Patent No.: US 7,440,492 B2
(45) Date of Patent: Oct. 21, 2008

(54) INTERFERENCE CANCELLER FOR CDMA MOBILE STATIONS

(75) Inventor: Kunifusa Maruyama, Tokyo (JP)

(73) Assignee: NEC Corporation (JP)

( * ) Notice: Subject to any disclaimer, the term of this patent is extended or adjusted under 35 U.S.C. 154(b) by 660 days.

(21) Appl. No.: 10/876,677

(22) Filed: Jun. 28, 2004

(65) Prior Publication Data

US 2004/0264557 A1 Dec. 30, 2004

(30) Foreign Application Priority Data

Jun. 26, 2003 (JP) ............................. 2003-182803

(51) Int. Cl.
*H04B 1/00* (2006.01)
(52) U.S. Cl. ....................... 375/148; 375/140; 375/141; 375/144
(58) Field of Classification Search ......... 375/130–153; 455/39, 63.1, 130, 269, 272, 278.1, 296
See application file for complete search history.

(56) References Cited

U.S. PATENT DOCUMENTS

| | | | | |
|---|---|---|---|---|
| 5,553,062 | A * | 9/1996 | Schilling et al. ............ | 370/479 |
| 5,579,304 | A * | 11/1996 | Sugimoto et al. ........... | 370/342 |
| 5,781,542 | A * | 7/1998 | Tanaka et al. .............. | 370/342 |
| 5,926,471 | A * | 7/1999 | Shoji ....................... | 370/342 |
| 6,157,687 | A * | 12/2000 | Ono ......................... | 375/347 |
| 6,553,058 | B1 | 4/2003 | Naito | |
| 6,584,115 | B1 | 6/2003 | Suzuki et al. | |
| 6,965,639 | B2 | 11/2005 | Uesugi et al. | |
| 7,023,933 | B2 | 4/2006 | Murakami et al. | |
| 7,079,607 | B2 * | 7/2006 | Brunel ....................... | 375/346 |
| 7,295,597 | B2 | 11/2007 | Fitton et al. | |
| 2001/0001008 | A1 * | 5/2001 | Dent ......................... | 375/271 |
| 2002/0172208 | A1 * | 11/2002 | Malkamaki ................. | 370/400 |
| 2003/0067967 | A1 | 4/2003 | Miyoshi et al. | |
| 2004/0247020 | A1 * | 12/2004 | Mills et al. ................. | 375/148 |
| 2006/0136975 | A1 | 6/2006 | Murakami et al. | |

FOREIGN PATENT DOCUMENTS

EP 0967734 * 12/1999

(Continued)

OTHER PUBLICATIONS

Shintaro Taira, et al.; "Automatic Recognition of Digital Modulation Type Based on Extraction of Feature and Inference"; IEICE Technical Report, Jun. 28, 1996, pp. 51-56.

*Primary Examiner*—Shuwang Liu
*Assistant Examiner*—James M Perez
(74) *Attorney, Agent, or Firm*—Dickstein, Shapiro, LLP.

(57) ABSTRACT

Parallel interference cancellers are connected in successive stages. In each canceller, multiple signal paths are provided for interference replica estimators to receive multiple CDMA channels. A spread code is generated for each signal path for dispreading the path components of the channel. In each signal path, the despread components are RAKE combined and a symbol replica is detected therefrom either by detecting or estimating the type of modulation. The detected symbol replicas are re-modulated and then re-spread to produce interference replicas. In each stage, the interference replicas are summed and subtracted from a delayed CDMA signal and then summed with the interference replicas of the same stage. Output signals from the final stage are despread and symbol replicas are recovered therefrom. For each signal path, a spread code is detected from a control channel and compared to the generated spread code. Those symbol replicas where a coincidence is detected are supplied to respective decoders and diversity combined.

6 Claims, 3 Drawing Sheets

FOREIGN PATENT DOCUMENTS

| | | |
|---|---|---|
| JP | 2000-13360 A | 1/2000 |
| JP | 2000-315993 | 11/2000 |
| JP | 2001-136084 A | 5/2001 |
| JP | 2001-203668 A | 7/2001 |
| JP | 2001-308826 A | 11/2001 |
| JP | 2002-204275 A | 7/2002 |
| JP | 2002-261851 A | 9/2002 |
| JP | 2003-152682 A | 5/2003 |
| JP | 2005-516463 A | 6/2005 |

\* cited by examiner

INTERFERENCE CANCELLER FOR CDMA MOBILE STATIONS

BACKGROUND OF THE INVENTION

1. Field of the Invention

The present invention relates generally to CDMA (code division multiple access) communication systems and more specifically to an interference cancelling technique for CDMA mobile stations.

2. Description of the Related Art

A multi-user interference canceller is known in the art of CDMA cellular communication systems as a means for combating the problem interference that results from asynchronous transmission of spread codes from mobile stations, as shown and described in Japanese Patent Publication 2000-315993. Being designed for use in a base station, the prior art multi-user interference canceller comprises a plurality of interference cancellers connected in successive stages, each interference canceller including a plurality of canceller units or interference replica estimators connected in parallel to simultaneously receive an incoming CDMA signal. The interference replica estimators are provided in number corresponding to the maximum number of data channels the base station can assign to mobile stations. In each stage, the interference replicas are summed in an adder and then subtracted from a delayed CDMA signal to produce an interference-cancelled residual signal, so that interference components of all users are cancelled from the received signal. In each stage, the residual signal is summed with the interference replicas of the individual data channels to produce symbol replicas and supplied to the next stage. The quality of the data channels is improved as the signals proceed from one stage to the next A number of decoders are connected to the outputs of the final stage to provide decoded symbol sequences.

In the case of mobile stations, the quality of communication link is guaranteed by assigning each mobile station a number of data channels to provide code diversity. Depending on the traffic, the number of assigned channels (or spread codes) is varied. In the HSDPA of W-CDMA, a maximum number of fifteen data channels is assigned to a mobile station if no other mobile users exist in the same coverage area of a base station. If there are three mobile users in a cell, they are each assigned a set of five spread codes, for example. In this case, each mobile user has no way of knowing which spread codes are assigned to the other mobile users. Therefore, in each mobile station, interference is cancelled only with respect to the assigned data channels. The signals spread with the unknown spread codes would be combined to produce an interference on each mobile user.

SUMMARY OF THE INVENTION

It is therefore an object of the present invention to provide an interference canceller for CDMA mobile stations.

The stated object is attained by having a mobile station produce interference replicas of other mobile stations by recovering symbol replicas from a despread signal. In a preferred embodiment, an estimation technique is used for identifying a modulation type to detect a data channel.

According to a first aspect of the present invention, there is provided an interference replica estimator for an interference canceller, comprising a code generator for generating a spread code of a data channel assigned to a mobile station, a despreader for despreading a received spread spectrum signal with the generated spread code, a data channel detector including a symbol detector for detecting a symbol replica from the despread signal and a modulator for re-modulating the detected symbol replica, a re-spreader for spreading the re-modulated symbol replica with the generated spread code to produce an interference replica, and a code detector for detecting, from a control channel, a spread code assigned to the mobile station, detecting a coincidence or a noncoincidence between the generated spread code and the detected spread code, making a first decision, in response to the detection of the coincidence, that the interference replica is destined for a home user, and making a second decision, in response to the detection of the noncoincidence, that the interference replica is destined for a non-home user.

According to a second aspect, the present invention provides an interference replica estimator for an interference canceller, comprising a code generator for generating a spread code of a data channel assigned to a mobile station, a plurality of despreaders for despreading path diversity components of a received data channel spread spectrum signal with the generated spread code to produce a plurality of despread signals, a RAKE combiner for combining the despread signals into a diversity combined signal, a data channel detector including a symbol detector for detecting a symbol replica from the diversity combined signal and a modulator for re-modulating the detected symbol replica, a plurality of re-spreaders for spreading the remodulated symbol replica with the generated spread code to produce a plurality of re-spread signals, an adder for summing the re-spread signals into an interference replica, and a code detector for detecting, from a control channel, a spread code assigned to the mobile station, detecting a coincidence or a noncoincidence between the generated spread code and the detected spread code, making a first decision, in response to the detection of the coincidence, that the interference replica is destined for a home user, and making a second decision, in response to the detection of the noncoincidence, that the interference replica is destined for a non-home user.

According to a third aspect, the present invention provides A CDMA receiver comprising an interference canceller, a plurality of despreaders for dispreading output signals of the interference canceller, a plurality of symbol detectors for detecting a plurality of symbol replicas from the despread signals, each of the symbol detectors determining from a control channel whether the symbol replica is destined for a home user or a non-home user, and producing an enabling signal if the symbol replica is determined to be destined for the home user and producing disabling signal if the interference replica is determined to be destined for the non-home user, a plurality of decoders respectively corresponding to the symbol detectors, each of the decoders decoding an output signal of the corresponding symbol detector in response to the enabling signal therefrom to produce a decoded output signal, and not producing a decoded output signal in response to the disabling signal therefrom, and a diversity combiner for diversity combining decoded output signals of the decoders. The interference canceller include a plurality of parallel interference replica estimators for respectively receiving a plurality of spread spectrum signals of different data channels, each of the interference replica estimators producing an interference replica from each of the spread spectrum signals, an adder for summing output signals of the interference replica estimators, a delay element for delaying the received spread spectrum signals, a subtractor for subtracting an output signal from the adder from the delayed spread spectrum signals to produce a residual signal, and a plurality of adders for summing the residual signal with the output signals of the interference replica estimators for supplying a plurality of output signals to the decoders.

Preferably, each of the interference replica estimators comprises a spread code generator for generating a spread code of one of the data channels assigned to a mobile station, a despreader for despreading the spread spectrum signal of one of the data channels with the assigned spread code, a symbol detector for detecting a symbol replica from the despread signal, a re-spreader for spreading the symbol replica with the assigned spread code to produce an interference replica, and a code detector for detecting, from a control channel, a spread code assigned to the mobile station, detecting a coincidence or a noncoincidence between the generated spread code and the detected spread code, making a first decision, in response to the detection of the coincidence, that the interference replica is destined for a home user, and making a second decision, in response to the detection of the noncoincidence, that the interference replica is destined for a non-home user. The code detector enables or disables a corresponding one of the decoders depending on the first or second decision.

According to a fourth aspect, the present invention provides a method of canceling interference, comprising the steps of (a) generating a plurality of spread codes for a plurality of data channels, (b) despreading received spread spectrum signals with the generated spread codes to produce a plurality of despread signals, (c) detecting a plurality of symbol replicas from the despread signals, (d) re-spreading the symbol replicas with the generated spread codes to produce a plurality of interference replicas, (e) summing the interference replicas to produce a sum, subtracting the sum from delayed spread spectrum signals to produce a residual signal and summing the residual signal with the interference replicas to produce a plurality of channel outputs, (f) detecting, from a plurality of control channels, a plurality of spread codes assigned to the mobile station corresponding to the plurality of symbol replicas and detecting a coincidence or a noncoincidence between each of the generated spread codes and a corresponding one of the detected spread codes, (g) dispreading the channel outputs and detecting a plurality of symbol replicas from the despread channel outputs, (h) responsive to the detection of at least one coincidence by step (f), decoding at least one corresponding symbol replica of step (g), and (i) diversity combining at least one decoded symbol replica.

BRIEF DESCRIPTION OF THE DRAWINGS

The present invention will be described in detail further with reference to the following drawings, in which.

DETAILED DESCRIPTION

Figure 1:
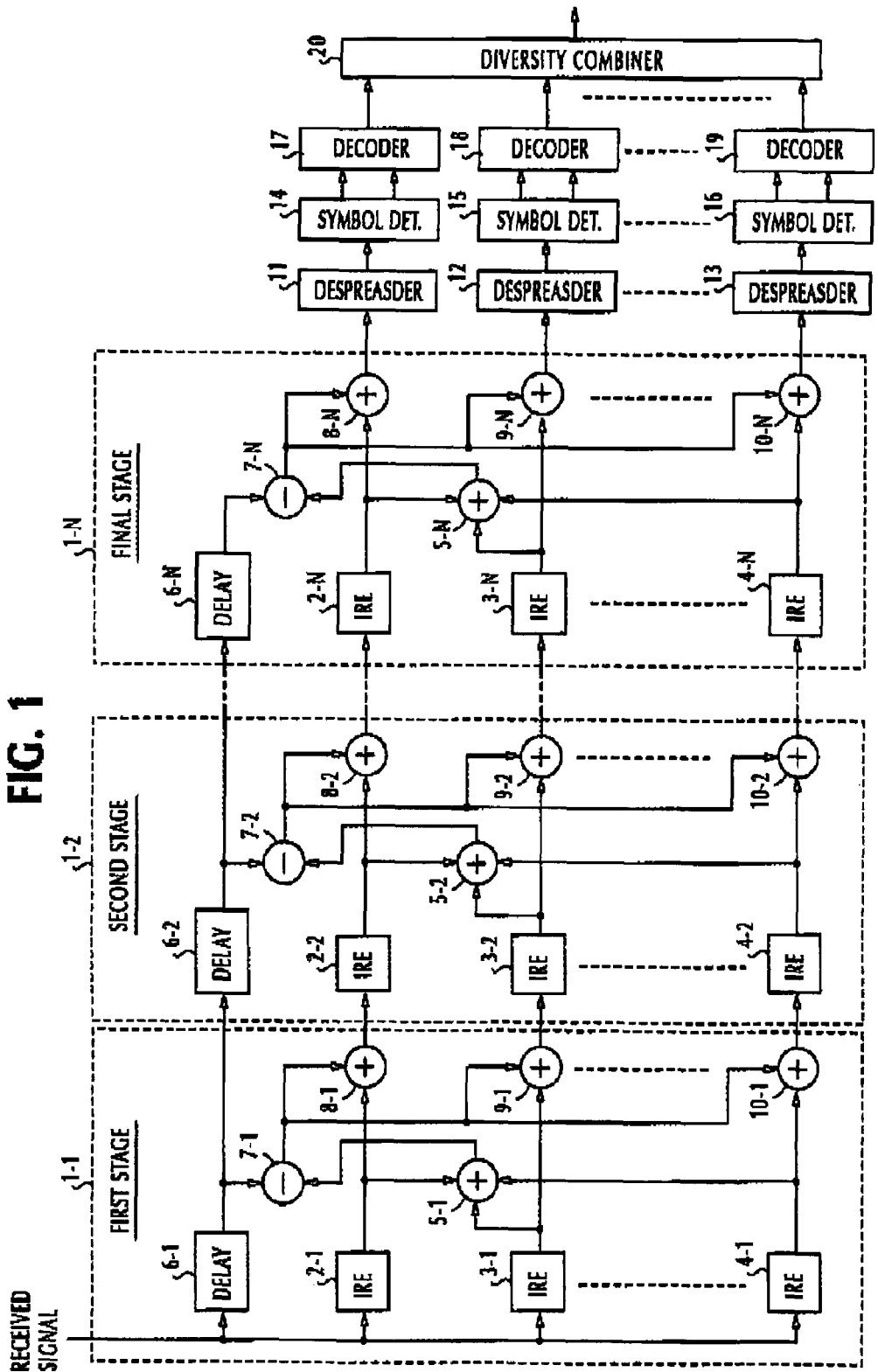
FIG. 1 is a block diagram of a block diagram of an interference cancelling system of a CDMA mobile station according to the present invention.

Referring now to FIG. 1, there is shown a CDMA receiver for a mobile station, including a plurality of interference cancellers connected in successive stages. Each of the interference cancellers comprises a plurality of interference replica estimators (IREs) corresponding to a plurality of code diversity branches. The IREs are provided in number corresponding to the maximum number of spread codes which can be assigned to a mobile station. In the High Speed Downlink Packet Access (HSDPA) system of W-CDMA wireless interface, the maximum number of spread codes available for a base station to be assigned to mobile stations is fifteen. In order to operate the interference canceller in a "code diversity mode", the base station assigns a varying number of spread codes to each mobile station depending on the volume of traffic, i.e., the number of mobile stations simultaneously communicating with the base station. Therefore, the mobile station may be assigned all fifteen spread codes if there is no other mobile stations in the coverage area of the base station.

For this reason, the interference cancelling system is provided with fifteen IREs for simultaneously receiving all CDMA channels. All fifteen IREs have their own spread code for respectively despreading all CDMA channels of a base station. All fifteen IREs, designated 2, 3 and 4, are connected in parallel to simultaneously receive assigned CDMA channels to produce interference replicas and connected in series to process the interference replicas in successive stages 1-1, 1-2, ..., 1-N (final). If there are three mobile stations simultaneously communicating with a base station, each mobile station may be assigned five spread codes for simultaneously receiving five CDMA channels.

The first stage 1-1 receives the incoming CDMA signal from a base station. The received signal is processed simultaneously by all IREs 2-1, 3-1 and 4-1 in a manner as will be discussed in detail later to produce interference replicas from the assigned CDMA channels as well as from the non-assigned CDMA channels (i.e., the CDMA channels assigned to the other (non-home) mobile stations. The outputs of all IREs 2-1, 3-1 and 4-1 are summed in an adder 5-1 and fed to a subtractor, or interference canceller 7-1 to remove the interference that occurs as a result of asynchronous timing between the spread codes assigned to different users. Meanwhile, the received signal is delayed by a delay element 6-1 by an amount corresponding to the processing time of the associated IREs 2-1, 3-1, 4-1 so that the delayed signal is time-coincident with the output of the adder 5-1 at the inputs of the subtractor 7-1. The sum of the fifteen interference replicas are subtracted from the delayed input signal in the subtractor 7-1 to produce a residual signal. This residual signal is supplied to adders 8-1, 9-1 and 10-1 and summed with the interference replicas of assigned and non-assigned CDMA channels from all IREs 2-1, 3-1 and 4-1. As a result, the output of adder 8-1 may represent an incoming user signal for the home mobile station if the latter is assigned the spread code of the IRE 2-1 and in this user signal interfering signals from other channels are cancelled, and the output of adder 8-2 may represent an incoming user signal for a non-home mobile station if the latter is assigned the spread code of the IRE 3-1 and in this user signal interfering signals from other channels are cancelled.

In the second stage, the IREs 2-2, 3-2 and 4-2 are configured to receive the output signals of adders 8-1, 9-1 and 10-2, respectively, and the output of the delay element 6-1 is supplied to a delay element 6-2. The outputs of IREs 2-2, 3-2 and 4-2 are summed in an adder 5-2, and subtracted from the output of delay element 6-2. A process similar to the fist stage 1-1 proceeds in the second stage 1-2, producing a set of fifteen user signals at the outputs of adders 8-2, 9-2 and 10-2. The user signals from the second stage are better in quality in comparison with the outputs of the first stage.

Each IRE has the ability to determine whether the channel it despreads with its own spread code is one that is assigned to the home mobile station or assigned to a non-home mobile station. If the latter is the case, the IRE proceeds to check the quality of the non-home-assigned channel and annihilate its interference replica if the quality is lower than some acceptable level. In this case, no interference replica is supplied to the next stage. Additionally, each IRE operates in a "path diversity mode". Hence a RAKE combiner is provided in each IRE for combining downlink channels transmitted over a plurality of possible propagation paths.

The same quality improving process continues until the user signals are processed by the final stage 1-N in which the IREs 2-N, 3-N and 4-N respectively receive the fifteen user signals of adders 8, 9 and 10 of the immediately preceding stage. The received signals are combined in the adder 5-N to produce a sum which is subtracted by subtractor 7-N from the output of the delay element 6-N and supplied to adders 8-N, 9-N and 10-N where the final residual signal is combined with the interference replicas from the IREs 2-N, 3-N and 4-N. The outputs of the final-stage adders 8-N, 9-N, . . . , 10-N are despread by multipath despreaders 11, 12, . . . , 13, respectively, and supplied to symbol detectors 14, 15, . . . , 16, respectively, for recovering the decoded fifteen user signals. Decoders 17, 18, . . . , 19 are respectively connected to the outputs of the symbol detectors 14, 15, . . . , 16 for decoding the recovered user signals into respective bit sequences. Each of the symbol detectors 14, 15, . . . , 16 produces a control signal indicating whether its output signal is destined for the home mobile station or a non-home mobile station. Those decoders which receive the signals of home users are enabled and their decoded outputs are supplied to a code diversity combiner 17 and diversity-combined, while those decoders receiving the signals of non-home users are disabled.

The HSDPA scheme further allows wireless transmission on one of two modulation schemes (4PSK and 16QAM) depending on the quality of the individual data channels. In addition to the code diversity operation the modulation type is assigned to each mobile station by a base station before establishing a call. A control message for informing the mobile station of the assigned spread codes and modulation type is called MCS (Modulation and channel Coding Scheme) and transmitted over the control channel, Therefore, the CDMA wireless communication system of this invention has a plurality of data channels and a control channel, and further includes a common channel. Spread codes $C_i$ (where i=0, 1, 2, . . . , 14) are assigned to individual data channels, a spread code $C_a$ to the common channel and a spread code $C_b$ to the control channel.

In a typical example, if there are three mobile stations in the coverage area (cell) of a base station, each of these mobile stations will be assigned a set of five spread codes $C_i$ for despreading transmitted data for diversity (RAKE) combining the despread signals. Each mobile station receives an MCS message indicating the spread codes assigned to the home mobile station. However, this MCS message does not indicate the spread codes of the other (non-home) mobile stations. For each mobile station, the data channels whose spread codes are unknown represent a potential cause of interference.

Figure 2:
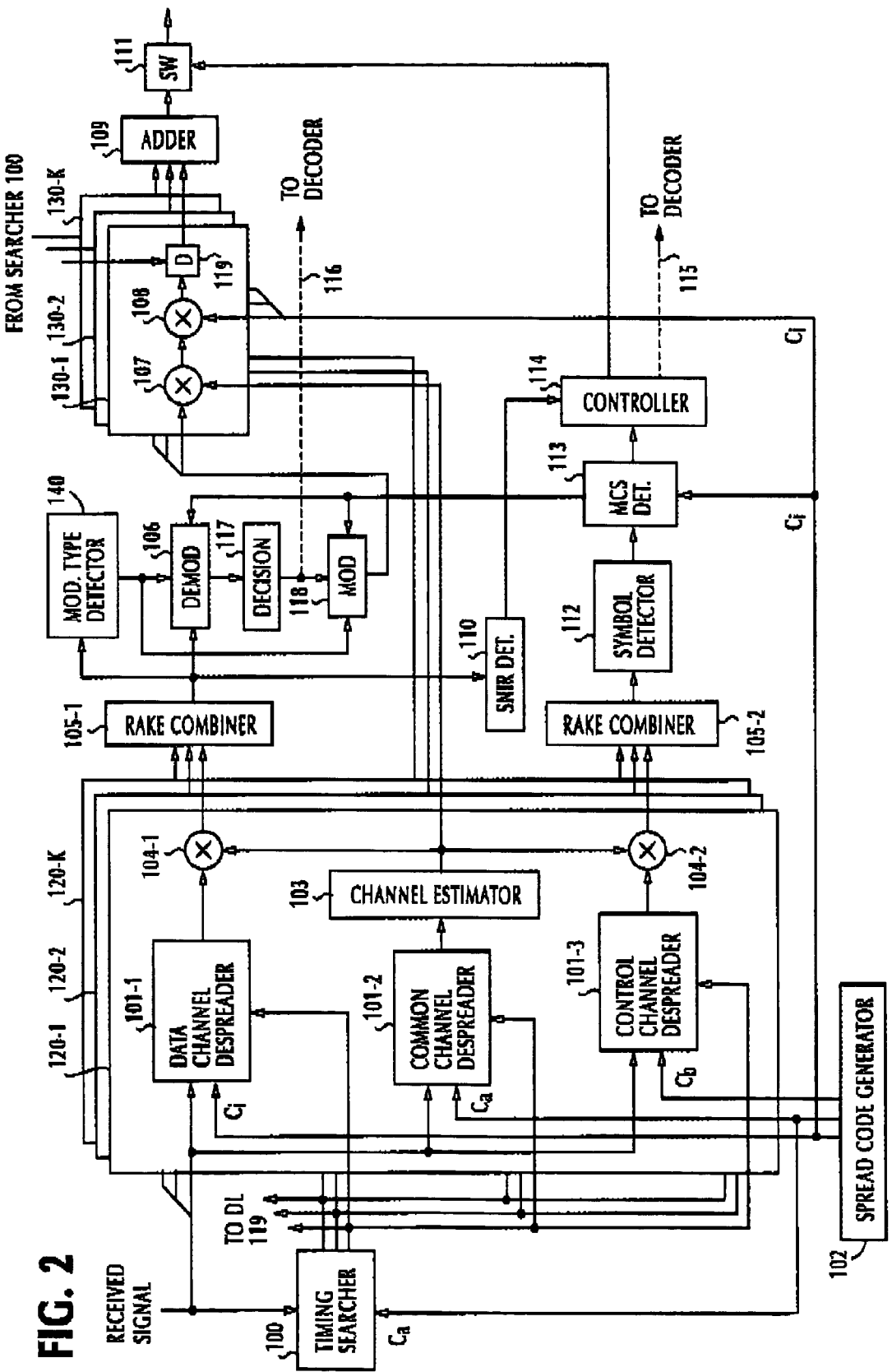
FIG. 2 is a block diagram of a universal type interference replica estimator of FIG. 1 which can be used for inter-stage and an input stage of decoders.

Details of each of the IREs 2, 3 and 4 are illustrated in FIG. 2. Since the IREs of FIG. 2 can be used for both inter-stage applications and an input stage of the decoders 14, 15, . . . , 16, his type of IREs is termed a universal type IRE.

In FIG. 2, the universal type interference replica estimator comprises a timing searcher 100, which uses the known spread code $C_a$ supplied from a spread code generator 102 and a correlation technique to find the best despread timing for each of the multiple paths of the transmitted CDMA signal. Spread code generator 102 of each IRE generates one of the fifteen spread codes for the data channel despreader 101-1 so that it differs from the data-channel spread codes of every other IREs, or code-diversity branches.

A plurality of despreading circuits 120-1, 120-2, 120-K of identical configuration are provided so that they correspond to a plurality of possible propagation paths of a transmitted signal. Each despreading circuit 120 includes a data channel despreader 101-1, a common channel despreader 101-2 and a control channel despreader 101-3. Each of these despreaders operates in response to the clock timing detected by the timing searcher 100 for the corresponding diversity branch. Data channel despreaders 101-1 of each despreading circuit 120 is supplied with a spread code $C_i$ (where i=0, 1, 2, . . . , 14) supplied from the spread code generator 102 for despreading one of the fifteen data channels. Common channel despreader 101-2 uses a predetermined spread code $C_a$ supplied from the code generator 102 to despread the common channel. Likewise, the control channel despreader 101-3 uses a spread code $C_b$ to despread the individual control channel.

The output of the common channel despreader 101-2 is supplied to a channel estimator 103 whose function is to estimate the channel impulse response (a complex value of phase rotation and amplitude variation) $\xi$ of each of the multipath fading channels from the despread common channel (pilot symbols). The estimated channel impulse response value $\xi$ and its complex conjugate $\xi\star$ are supplied to a complex multiplier 104-1 to which the output of data channel despreader 101-1 is also applied. By multiplying the despread data channels by the estimated complex value in the complex multiplier 104-1, the data channel transmitted on a propagation path is phase and amplitude compensated, eliminating the factors the propagation path has affected on the data channel. In a similar manner, the control channel transmitted on the same propagation path is phase and amplitude compensated in a complex multiplier 104-2 using the same complex values.

A data channel transmitted on a diversity path to the home mobile station appears at the output of the complex multiplier 104-1 of each of the K despreading circuits 120. The data channel outputs of all despreading circuits 120 are diversity combined in a RAKE combiner 105-1 into an output, signal. The output signal of RAKE combiner 105-1 is simultaneously supplied to a data-channel symbol detector that comprises a demodulator 106 and a decision device 117, the output of the symbol detector being supplied to a modulator (or re-modulator) 118. The symbol detector and the modulator 118 constitute a data channel detector necessary to reproduce properly spread data channel signal. The output of RAKE combiner 105-1 is also supplied to a modulation type detector 140 and a SNIR (signal to noise and interference ratio) detector 110. In the symbol detector, the demodulator 106 detects a modulated data channel by demodulating the RAKE-combined signal according to a modulation type communicated from a MCS (Modulation and Coding Scheme) detector 113. Decision device 117 performs a decision process such as convolutional sequence estimation, maximum likelihood estimation, or hard decision algorithm on the demodulated PSK or QAM signal and recovers a symbol replica. Modulator 118 re-modulates the symbol replica according to the same modulation type detected by the MCS detector 113 and supplies its output to a plurality of re-spreaders 130-1~130-K which correspond to the despreading circuits 120-1~120-K, respectively.

On the other hand, the control channel transmitted on a diversity path to the home mobile station appears at the output of the complex multiplier 104-2 of each despreading circuit 120. The control channel outputs of all despreading circuits 120 are diversity combined in a RAKE combiner 105-2 into an output signal, which is then applied to a control-channel symbol detector 112. Since the type of modulation employed for the transmission of a control channel is known in advance to both the base station and the mobile station, the control-channel symbol detector 112 uses the known modulation type to detect the RAKE-combined control channel and additionally uses the maximum likelihood estimation and hard decision algorithms to recover the original control signal.

The control signal recovered by the symbol detector 112 is coupled to the MCS detector 113. From the control signal the MCS detector 113 extracts MCS information indicating the type of modulation used in transmitting the downlink data channel and the spread codes assigned to the home mobile station. MCS detector 113 is supplied with the spread code $C_i$ from the spread code generator 102. MCS detector 113 compares the spread code $C_i$ with the spread codes extracted from the MCS information. If the MCS detector 113 detects a match between the spread code $C_i$ and any one of the extracted spread codes, it determines that the output of the RAKE combiner 105-1 is one of the data channels assigned to the home mobile station and informs the demodulator 106 of the determined modulation type. Otherwise, the MCS detector 113 makes a decision that the output of RAKE combiner 105-1 is a data channel assigned to a non-home mobile station and communicates this fact to the demodulator 106.

MCS detector 113 further informs a controller 114 of the result of the decision indicating whether the received data channel is assigned to the home or non-home mobile station.

If the output of RAKE combiner 105-1 is a home-assigned data channel, the demodulator 106 is informed of the modulation type of the data channel by the MCS detector 113. A symbol replica of the data channel is recovered from the output of the demodulator 106 by the decision device 117 and then re-modulated by the modulator 118 according to the modulation type of the data channel. The remodulated symbol replica of the home user is supplied to the re-spreading circuits 130-1~130-K to reconstitute a plurality of components of an interference replica. Each of the re-spreading circuits 130 includes a pair of series-connected multipliers 107 and 108 and a delay timing adjustment element 119. The output of the modulator 118 is multiplied first in the multiplier 107 by the estimated channel impulse response value $\xi$ supplied from the corresponding despreading circuits 120 to reconstitute the same user signal as one that appeared before the phase and amplitude compensation is performed. The reconstituted signal is then multiplied (i.e., re-spread) in the second multiplier 108 by the spread code $C_i$ of the assigned channel to reproduce a data-channel component of the spread spectrum interference replica. The output of the multiplier 108 is then output from the delay element 119 in response to the chip timing replica from the timing searcher 100. A number of interference replica components from the re-spreading circuits 130-1~130-K are combined in an adder 109 to produce an interference replica of the data channel, which is fed to an ON-OFF transmission gate or switch 111. Since the controller 114 has been informed by the MCS detector 113 that the received data channel is assigned to the home mobile station it turns on the switch 111 to allow the output of adder 1109 to be supplied to the next stage.

If the output of RAKE combiner 105-1 is a data channel assigned to a non-home user, the demodulator 106 is informed of his fact from the MCS detector 113 and uses the output signal of the modulation type detector 140, instead of the modulation type information contained in the control channel. Modulation type detector 140 estimates the type of digital modulation of the data channel from the output of the RAKE combiner 105-1 based on a feature extraction and estimation algorithm as described in a Technical Report (PRMU 96-44) of the Electronics, Information and Communications Institute of Japan. Demodulator 106 detects a symbol replica of the data channel of the non-home mobile station by modulating the output of the RAKE combiner 105-1 according to the estimated modulation type and the decision device performs a decision process on the demodulated signal to detect a symbol replica of the non-home user signal and supplies to the modulator 118. Modulator 118 remodulates the decision output in accordance with the modulation type estimated by the modulation type detector 140 and feeds its output the respreading circuits 130-1~130-K. The remodulated symbol replica of the non-home user is multiplied by the channel impulse response in the multipliers 107 and then re-spread with the spread code $C_i$ assigned to this non-home user. The interference replica components of the non-home mobile user are then combined by the adder 109 into an interference replica. Since the controller 114 has been informed by the MCS detector 113 that the received data channel is assigned to a non-home mobile station, it compares the SNI ratio of the data channel to an acceptable threshold. If the SNI ratio is higher than the threshold, the controller 114 turns on the switch 111 to allow the output of adder 109 to pass through to the next stage. When the signal quality is lower than the threshold, the controller 114 annihilates this signal by turning off the switch 111.

In an alternative embodiment, the modulation type detector 140 can also be used to determine the type modulation for the home-assigned data channel, instead of using the output of MCS detector 113.

Each of the IREs can also be used as an input stage of the decoder, instead of the despreader 11 (12, 13) and the symbol detector 14 (15, 16). If an IRE is used as an input stage of an associated decoder, the controller 114 of this IRE is connected to the associated decoder through a control line 115. Through this control line, the controller 114 enables the associated decoder when the received data channel is the home user signal. Otherwise, it disables the associated decoder. In his case, the symbol replica detected by the decision device 117 is supplied through a signal line 116 to the associated decoder. When the latter is enabled, the symbol detected by the decision device 117 is decoded into the original bit sequence.

Figure 3:
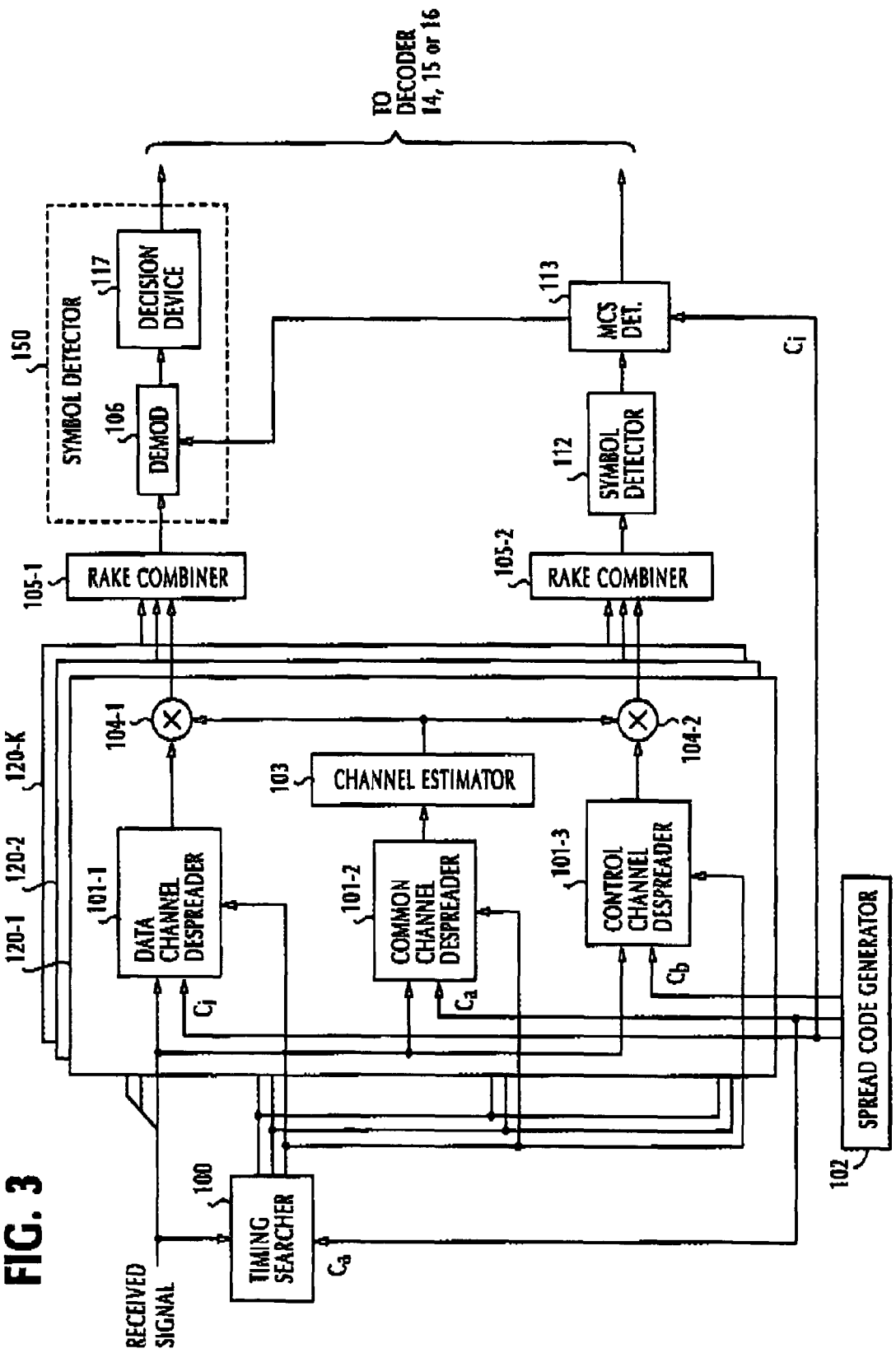
FIG. 3 is a block diagram of a circuit arrangement, which is a modified form of the IRE of FIG. 2, for use as an input stage of a decoder.

FIG. 3 illustrates a circuit arrangement of the multipath despreader and the symbol detector. In FIG. 3, this circuit arrangement is a modified form of the IRE of FIG. 2 and elements corresponding in significance to those of FIG. 2 are marked with the same numerals and the description thereof is omitted. Since it is not necessary to reconstitute an interference replica at the input stage of the decoders 17, 18, . . . , 19, the circuit elements associated with non-home user signals are eliminated from the IRE of FIG. 2, leaving the demodulator 160 and decision device 117 as a symbol detector 150 for the data channel, and the symbol detector 112 and MCS detector 113 for the control channel. The output of the decision device 117 is connected to the input of the associated decoder and the output of the MCS detector 113 is the control signal for enabling or disabling the associated decoder depending on the destination of the arriving signal.

What is claimed is:

1. A method of canceling interference in a CDMA receiver of a mobile station that receives from a base station a spread spectrum signal containing a varying number of data channels depending on a number of mobile users simultaneously communicating with the base station, comprising the steps of:

a) generating different spread codes corresponding to a maximum number of data channels that can be assigned to said mobile station;

b) despreading the received data channels with spread codes of the received data channels to produce a plurality of despread data channel signals;

c) demodulating said despread data channel signals and making a decision on the demodulated data channel signals to detect a first plurality of symbol replicas and re-modulating said first plurality of symbol replicas;

d) re-spreading the re-modulated symbol replicas with the spread codes of the received data channels to produce a plurality of re-spread interference replicas;

e) enabling each of the re-spread interference replica in the plurality if a spread code of a corresponding despread data channel signal coincides with a spread code of a data channel assigned to the mobile station by the communicating base station;

f) summing said enabled re-spread interference replicas to produce a combined re-spread interference replica;

g) subtracting said combined re-spread interference replica from a delayed spread spectrum signal to produce a residual signal;

h) summing said residual signal with said enabled re-spread interference replicas to produce a plurality of combined signals;

i) despreading said plurality of combined signals to produce a plurality of despread combined signals;

j) detecting a second plurality of symbol replicas from said despread combined signals;

k) decoding said second plurality of symbol replicas; and l) diversity combining said decoded second plurality of symbol replicas.

2. The method of claim 1, wherein step (e) further comprises:

determining a quality of each of the despread data channel signals; and enabling said re-spread interference replicas in the plurality if the determined quality of the corresponding despread data channel signal is higher than an acceptable level.

3. The method of claim 1, wherein step (c) further comprises the steps of:

detecting a modulation type of each of said received data channel signals; and demodulating said despread data channel signals to detect said first plurality of symbol replicas according to the detected modulation type and re-modulating said first plurality of symbol replicas according to said detected modulation type.

4. A CDMA receiver of a mobile station for receiving from a base station a spread spectrum signal containing a varying number of assigned data channels depending on a number of mobile users simultaneously communicating with the base station, comprising:

means for generating different spread codes corresponding to a maximum number of data channels assignable to said mobile station;

a plurality of despreaders for despreading the spread spectrum signal with spread codes of the received data channels to produce a plurality of despread data channel signals;

a plurality of first symbol detectors for detecting a plurality of symbol replicas by respectively demodulating said plurality of despread data channel signals and making a decision on the demodulated signals;

a plurality of modulators for re-modulating said plurality of symbol replicas;

a plurality of re-spreaders for respectively re-spreading the re-modulated symbol replicas with the spread codes of the received data channels to produce a plurality of re-spread interference replicas;

a plurality of discrimination circuits for enabling each of said plurality of re-spread interference replicas if the spread code of a corresponding received data channel coincides with a spread code assigned to the mobile station by the communicating base station;

an adder for summing the enabled re-spread interference replicas to produce a combined re-spread interference replica;

a delay element for delaying said received spread spectrum signal;

a subtractor for subtracting said combined re-spread interference replica from the delayed spread spectrum signal to produce a residual signal;

a plurality of adders for summing said enabled re-spread interference replicas with said residual signal to produce a plurality of combined signals;

a plurality of despreaders for respectively despreading said combined signals to produce a plurality of despread combined signals;

a plurality of second symbols detectors for detecting a second plurality of symbol replicas from said plurality of despread combined signals;

a plurality of decoders for decoding said second plurality of symbol replicas; and a diversity combiner for diversity combining said second plurality of symbol replicas decoded by said plurality of decoders.

5. The CDMA receiver of claim 4, further comprising a plurality of quality detectors for determining a quality of each of said despread data channel signals;

wherein each of said discrimination circuits further enables each of said re-spread interference replicas if the determined quality of the corresponding despread data channel signal is higher than an acceptable level.

6. The CDMA receiver of claim 4, further comprising means for detecting a modulation type of each of said received data channels;

wherein each of said first symbol detectors demodulates said despread received data channels according to the detected modulation type and each of said modulators re-modulates said second plurality of symbol replicas according to said detected modulation type.

* * * * *